Jan. 20, 1959 G. B. SHIELDS 2,869,240

TAPE FOOTAGE INDICATOR

Filed Nov. 25, 1953 2 Sheets-Sheet 1

INVENTOR.
George Sheilds
BY
Mason, Kolehmainen, Rathburn & Wyss
Att'ys.

Jan. 20, 1959 G. B. SHIELDS 2,869,240

TAPE FOOTAGE INDICATOR

Filed Nov. 25, 1953 2 Sheets-Sheet 2

INVENTOR.
George Sheilds
BY
Mason, Kolehmainen, Rathburn & Wyss
Attys.

United States Patent Office 2,869,240

Patented Jan. 20, 1959

2,869,240

TAPE FOOTAGE INDICATOR

George B. Shields, Racine, Wis., assignor to Webster Electric Company, Racine, Wis., a corporation of Delaware Application November 25, 1953, Serial No. 394,381

4 Claims. (Cl. 33—127)

This invention relates generally to indicating devices for recording and reproducing apparatus and more particularly to an attachment for use with such apparatus in order to indicate the movement of an elongated recording medium during recording or reproduction and during rewinding.

Indicating apparatus of the type involved in the present invention is preferably employed in conjunction with sound recording and reproducing devices employing a wire or tape of magnetizable material as a recording medium. In recorders and reproducers of the above indicated character the wire or tape is conventionally advanced through a recording or reproducing head from a supply spool to a take-up spool. Frequently the recording medium is several hundred feet in length and is adapted to record a number of short recordings or a single relatively long recording for subsequent reproduction. It becomes desirable, therefore, to provide a continuous indication of the progress of the recording medium from the supply spool to the take-up spool both for the purpose of identifying the position of any particular message unit along the tape length and for providing an indication of the unused portion of the medium remaining on the supply spool as well as a particular section of the tape during rewinding of the record from the take-up to the supply spool.

Although some recorders and reproducers presently available include indicating means for indexing and identifying different portions of the recording medium, a large number of such devices have been marketed which do not incorporate such means and, consequently, to increase the utility of these latter records it is desirable to provide an indicating attachment which may be added to the recorder without necessitating a reconstruction thereof. It is, therefore, an object of the present invention to provide an indicating mechanism which may be readily attached to and employed in conjunction with recording apparatus currently in use and which can be used also in new equipment.

It is another object of the present invention to provide an indicating mechanism of the above indicated character which is mechanically simple and as a consequence is inexpensive to construct.

A further object of the invention is to provide an indicating mechanism adjustable in size in order to facilitate its use with a number of commercially produced recording devices.

A still further object of the invention is to provide a mechanism of the above indicated character which is readily detachable from its associated recording apparatus in order to permit the use of the indicator on different recording devices.

The invention both as to its organization and method of operation, together with further objects and advantages thereof will best be understood by reference to the specification taken in connection with the accompanying drawings in which.

In accordance with the present invention, the foregoing and other objects are realized by providing a registering means for indicating the movement of a recording medium from a supply spool to a take-up spool or from the latter to the supply spool. The registering means is driven at a rate corresponding to the rate of rotation of one of the spools, preferably the take-up spool, in order to provide a continuous indication of the tape movement. As each message unit is recorded on the medium, the indication of the registering means corresponding to the tape position at that instant may be noted thereby identifying the particular portion of the tape length along which each unit is recorded. Thus the registering means provides means for indexing and identifying the tape so that subsequent reproduction of any individual message unit may be effected without necessitating a complete playback of the entire length of the recording medium. In order to provide a means for anchoring the registering means in position on the take-up spool, the indicating attachment includes an extendable arm, one end of which mounts the registering means and the other end of which is pivoted about a fixed point remote from the take-up spool. The extendable arm facilitates the use of the indicating attachment on a number of devices having take-up spools of different size and having various mechanical constructions.

Figure 1:
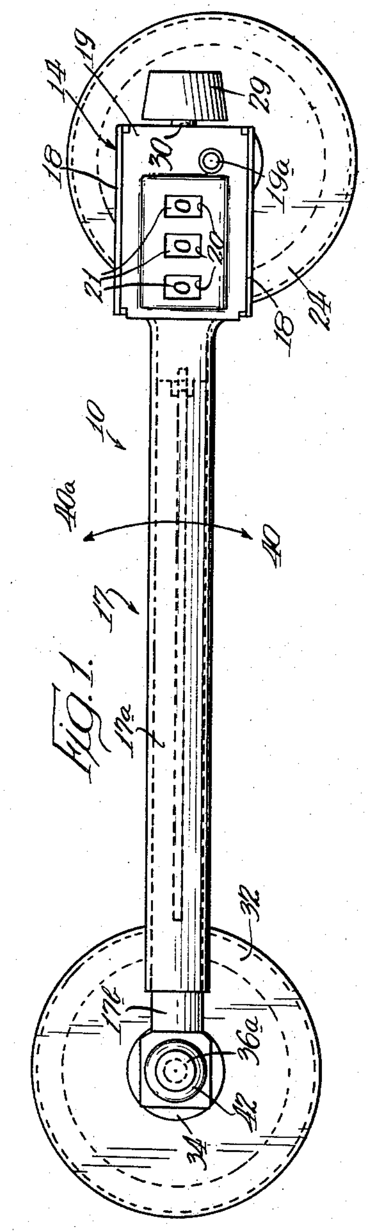
Fig. 1 is a plan view of one embodiment of an indicating apparatus constructed in accordance with the present invention.
Figures 2, 3:
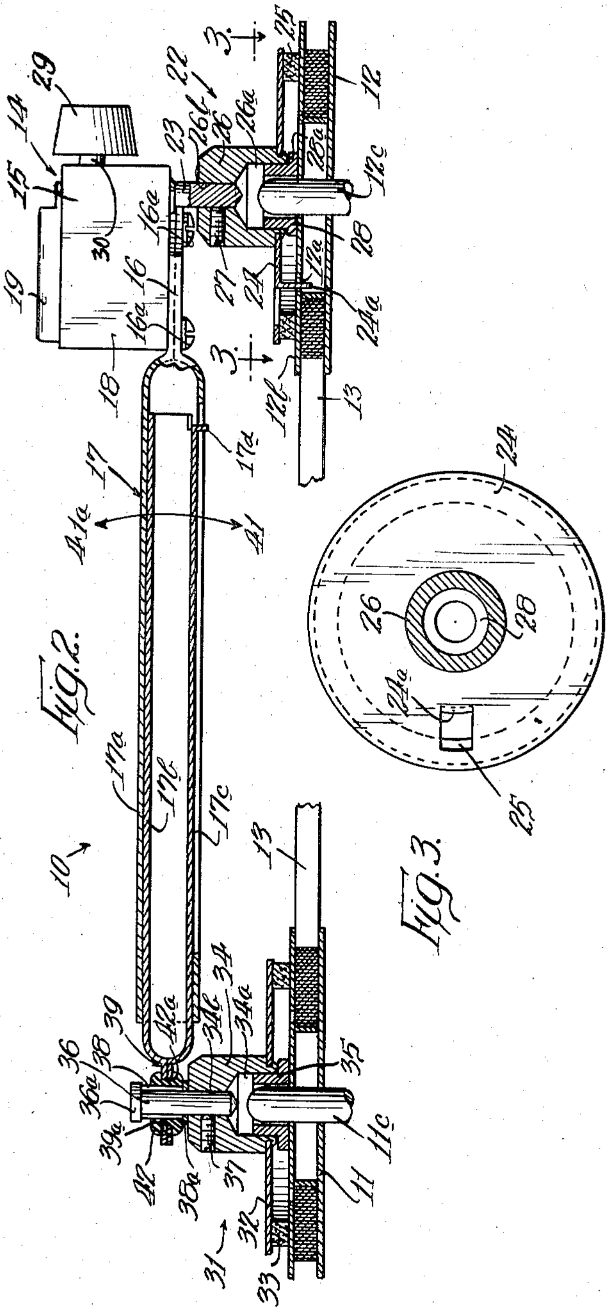
Fig. 2 is an elevational view, partially in section, of the apparatus shown in Fig. 1.
Fig. 3 is a cross sectional view taken along a line substantially corresponding to the line 3—3 in Fig. 2 assuming that the entire structure is shown in Fig. 2.

Referring now to the drawings and more particularly to Figs. 1 and 2, there is shown an indicating attachment indicated generally by the reference character 10 illustrated in its application for use with a magnetic tape recorder and reproducer although it should be understood that the invention may be employed with equal facility in conjunction with other types of recording and reproducing devices such, for example, as wire recorders. The indicating attachment 10 is adapted to be mounted at its opposite ends on a supply spool 11 and a take-up spool 12 of a recording and reproducing apparatus not shown in the drawings since the particular construction of the recorder and reproducer constitutes no part of the present invention. The supply spool 11 contains either a supply of unused magnetizable tape 13 constituting a recording medium for advancement through a suitable recording head (not shown) of the recording and reproducing apparatus or, alternatively, a supply of magnetized tape having messages recorded thereon for advancement through a reproducing head of said apparatus. In either case, the recording medium is supplied to and wound upon a take-up spool 12 which is rotated by a suitable drive source also omitted from the drawings for the purpose of simplification. The tape may also, in conventional manner, be rewound on spool 11 after having been wound on the take-up spool.

In order to facilitate the removal and insertion of the spools 11 and 12, these spools may be mounted upon the exposed ends of spaced parallel shafts **11*c* and 12*c* of the recording apparatus, the take-up spool 12 being preferably mounted for rotation with the drive shaft 12*c* and the supply spool 11 being preferably mounted for rotation with the shaft 11*c* spaced at a fixed distance from the drive shaft. In accordance with the present invention, a means, indicated generally by the reference character 14, is provided for counting and registering the number of revolutions of the take-up spool 12 as the tape 13 is advanced from the supply spool 11** on to the take-up spool. By noting the indication of the registering mechanism, the position of each message or particular portions of a message along the tape is identified in order to permit the selective reproduction of any desired message or portion at a later time.

The counting and registering mechanism 14 is disposed within a suitable U-shaped cover 15 and attached to a substantially horizontally extending flat end portion 16 of an elongated arm member 17 by any suitable means such as by the machine screws **16*a* extending through the flat end portion of the arm into engagement with internally threaded apertures in the bottom of the mechanism 14. The housing 15 may be comprised of substantially rectangular side plates 18 and a cover plate 19 held in position by a machine screw 19*a*. The cover plate 19 is provided with a plurality of aligned spaced viewing apertures 20 through which exposed digits or counters 21 of the counting mechanism 14 are visible. In order to effect the movement of the counting digits 21 to either add or subtract as the tape 13 is advanced on the take-up spool 12 or removed therefrom, the indicating attachment 10 includes a coupling means or drive assembly 22 removably attached to the spool 12 and to the end of the counting mechanism actuating shaft which extends downwardly from the housing 15 and is positioned coaxially with respect to the drive shaft 12*c*** for the take-up spool.

The interconnection of the take-up spool 12 and the drive assembly 22 is effected by means of a suitable lug receiving aperture **12*a* formed in flange plate 12*b* of the take-up spool in order to accommodate a downwardly projecting lug 24*a* formed integral with a flat metallic disc 24 constituting one element of the drive assembly 22. To eliminate direct contact between the metallic disc 24 and the upper surface of the side plate 12*b* and thus to reduce friction and play between these elements when placed in position on the take-up spool 12, a suitable annular washer 25 formed of felt or other cushioning material is secured to the under side of the disc 24**.

The disc 24 is secured to a metallic bushing 26 preferably formed of aluminum or light metal and having a longitudinal bore **26*b* therein for receiving the counter actuating shaft 23. The drive assembly 22 and shaft 23 are drivingly interconnected as by the set screw 27**.

To facilitate the rotation of the drive assembly 22 with the spool drive shaft **12*c*, there is journalled within an enlarged chamber 26*a* formed in the bushing 26 a hollow cylindrical bearing 28 surrounding the drive shaft and having a flanged portion 28*a*. The flanged portion is positioned between the flange plate 12*b* of the take-up spool and the lower end of the bushing 26**.

Accordingly, the take-up spool 12 is operatively connected to the actuating shaft 23 of the counting and registering mechanism 14 so that the spool and shaft are conjointly rotated. The shaft 23 reversibly drives through suitable gearing the exposed counters 21 of the counting and registering mechanism in order to provide an indication of the tape position on the take-up spool. The counters 21 are preferably calibrated to read the number of revolutions of the take-up spool 12 involved in moving the tape through its length from a zero position on the supply spool 11.

From the foregoing explanation, it is apparent that the means 14 correctly indicates the number of revolutions of the take-up spool 12 or the footage of tape wound upon the take-up spool at any instant. Preferably, the means 14 is zeroed at the start of the winding operation when one end of the tape is initially inserted on the take-up spool by means of a control knob 29 positioned outside of the mechanism 14 on the exposed end of a shaft 30 connected to the gearing of the counting and registering mechanism. This control knob may be operated manually in order to rotate the counters 21 independently of the shaft **12*c* until a zero reading is obtained on the counters corresponding to the zero position of the tape 13**.

The counting and registering mechanism 14 is prevented from rotating as a whole with the shaft 23 in order that the counters 21 may provide an accurate indication of the rotation of the take-up spool. In order to maintain the counting and registering mechanism in fixed positioin, the arm member 17 upon which the counting mechanism is mounted has one end pivoted about a fixed point remote from the mechanism 14. In the embodiment of the invention shown in Figs. 1 and 2, the remote end of the arm 17 is pivotally mounted on the supply spool shaft **11*c* by means of an idler assembly designated generally by the reference character 31. The idler assembly 31 includes a flat apertured idler disc 32 separated from the upper flange plate of the supply spool 11 by a washer 33 formed of felt or other cushioning material. The idler disc 32 is mounted on a bushing 34 that is similar in construction to the bushing 26 in that it includes an enlarged chamber 34*a* and a longitudinal bore 34*b* extending upwardly from the enlarged chamber. To facilitate the rotation of the assembly 31 about the supply spool shaft 11*c*, a hollow cylindrical flanged bearing 35 surrounding the spool shaft is mounted in chamber 34*a*. The longitudinal bore 34*b* is formed co-axially with the enlarged chamber 34*a* in order to receive a pin 36 about which the arm member 17 is pivoted. The pivot pin 36 is secured to bushing 34 by a set screw 37. The pivot pin 36 has a flanged upper head 36*a* against which one end of a surrounding hollow cylindrical bearing 38 abuts. The bearing has a flanged portion 38*a* at its lower end which rests on the upper face of the bushing 34**.

To permit rotation of the arm 17 and the recording and counting mechanism mounted thereon in a horizontal plane about the longitudinal axis of the pivot pin 36 in the directions indicated by the arrows 40 and **40*a* in Fig. 1, remote end 39 of the arm member is provided with an opening 39*a* for insertion over the pivot pin. The diameter of the opening 39*a* is somewhat greater than the diameter of the bearing 38 thereby permitting slight pivoting movement of the arm 17 in a vertical plane about an axis perpendicular to the longitudinal axis of the pivot pin 36 in order to move the recording mechanism 14 and the drive assembly 22 in a direction corresponding to the arrows 41 and 41*a* in Fig. 2. To provide a means for eliminating the play between the end portion of the arm 17 while at the same time permitting the slight vertical movement of the arm 17, the bore 38 is surrounded by a resilient grommet 42 having an annular groove 42*a* for accommodating the edges of opening 39*a*** in the end portion of the arm.

As indicated above, the attachment 10 is designed for operation with a number of different types of recording and reproducing devices having take-up and supply spools mounted for rotation about spaced axes positioned at various distances apart. To increase the versatility of the attachment 10 and to enable its use in conjunction with various types of recording and reproducing devices regardless of the separation between take-up and supply spools, the arm 17 is adjustable in length thereby permitting an adjustment of the distance between the idler assembly 31 and the drive assembly 22. The adjustability of the arm 17 may be effected by providing a pair of telescopically arranged elongated tubular arm members 17*a* and 17*b*, one of said arm members being provided with an elongated longitudinal slot 17*c* in its surface for accommodating a laterally extending tab 17*d* formed integral with the other tubular member 17*b*. Obviously, the length of the arm 17 may be varied by telescoping the arm members and moving the tab 17*d* within the slot 17*c* until the desired length is achieved.

From the foregoing explanation, it is apparent that in assembling the indicator attachment 10 upon the recording and reproducing apparatus, the idler assembly 31 is positioned on the supply spool 11 so that the bearing 35 surrounds the supply spool shaft 11*c*. The arm 17 is extended to the desired length and the end 16 of the arm 17 mounting the recording and counting mechanism 14 and the drive assembly 22 is then rotated about the axis of rotation of the supply spool 11 until the lug 24*a* contacts the take-up spool 12. The arm 17 is then pivoted slightly in a vertical plane to permit the lug to pass over the upper flange plate 12*b* of the take-up spool; it registers with the aperture 12*a* and locks the drive assembly 22 for rotation with the take-up spool 12. The counters 21 are then set to zero by means of the control knob 29 so that the counters actually indicate the rotations of spool 12 and thus the length of tape thereon. This indication is given for both forward and rewind movement of the tape, thus enabling a desired portion of the tape readily to be located.

Figures 4, 5, 6, 7, 8:
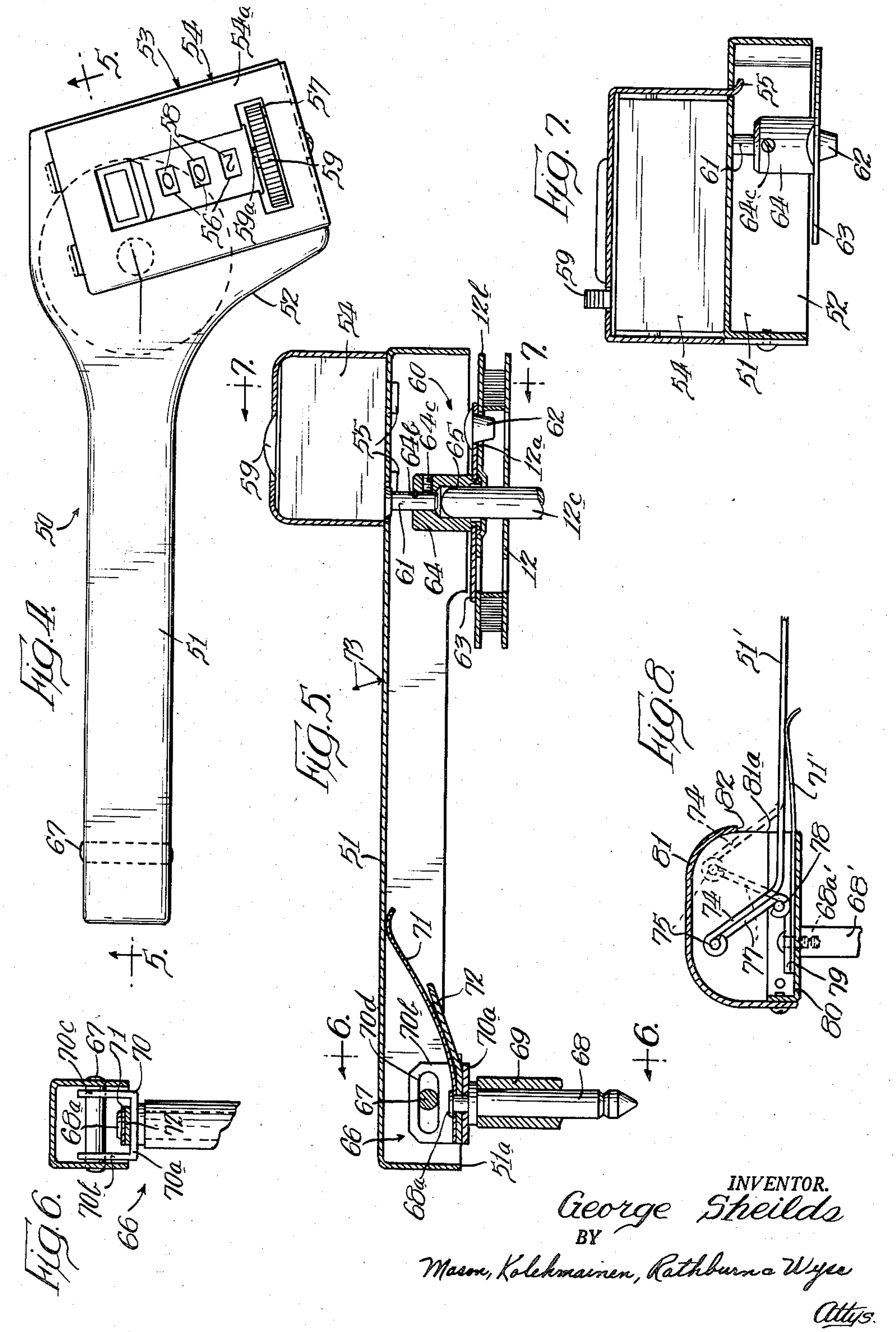
Fig. 4 is a plan view of an indicating apparatus constituting a second embodiment of the present invention.
Fig. 5 is a cross sectional view of the apparatus taken along a line substantially corresponding to line 5—5 of Fig. 4.
Fig. 6 is a transverse cross sectional view along the line 6—6 of Fig. 5, assuming that Fig. 5 shows the entire apparatus, and illustrates the details of the pivot mechanism of the indicating device.
Fig. 7 is a cross sectional view looking in the direction of the arrow 7 of Fig. 5 assuming that Fig. 5 shows the entire structure of the apparatus.
Fig. 8 is a fragmentary vertical longitudinal cross sectional view illustrating the details of an alternative construction for the pivot mechanism of the apparatus shown in Fig. 4.

A second embodiment of the invention is illustrated in Fig. 4 which shows an indicating attachment 50 including an arm member 51 formed of sheet metal and having an enlarged end portion 52 for mounting the counting and registering mechanism 53. The counting and registering mechanism may be disposed within an enclosed housing 54 attached to the arm member 51 by any suitable means such, for example, as machine screws 55 shown in Fig. 5. An upper cover plate 54*a* of the housing 54 is provided with a plurality of spaced and aligned openings 56 and an elongated opening 57, the openings 56 having counters 58 of the counting and registering mechanism 54 in registry therewith in order to permit the counters to be viewed. The opening 57 accommodates a manually operable control knob 59 for zeroing the counting digits 58 at zero position of the tape 13 on the take-up spool 12. An actuating shaft 61 for driving the counters of the registering mechanism 58 extends from the bottom of the housing 54 into engagement with drive assembly 60 preferably mounted for rotation with the take-up spool 12. The drive assembly 60 interconnects the shaft and the take-up spool 12 in order to impart the rotation of the drive shaft 12*c* to the shaft 61. The drive assembly 60 is connected to the upper side 12*b* of the take-up spool by a lug 62 secured to a flat metallic disc 63 and engaged in an aperture 12*a* in flange plate 12*b* of the spool. Secured to the flat metallic disc 63 and extending upwardly therefrom is a cylindrical bushing having an enlarged chamber 64*a* formed at its lower end and having a longitudinal bore 64*b* extending upwardly from the enlarged chamber co-axially of the cylindrical bushing in order to accommodate the actuating shaft 61 of the registering and counting mechanism. The shaft 61 is secured to bushing 64 in any suitable manner as, for example, by a set screw 64*c*.

It is thus apparent that the drive assembly 60 induces the rotation of the shaft 61 at a rate corresponding to the rate of rotation of the take-up spool 12, thereby driving the counters 58 at a similar rate.

To provide a means for anchoring the remote end of the arm 51 in order to prevent rotation of the recording and counting mechanism 54 with the shaft 61, the arm 51 has a pivot assembly 66 mounted on the remote end thereof by means of a horizontal pivot pin 67. The pivot assembly 66 is fixedly positioned at a point remote from the axis of rotation of the take-up spool 12 and includes a vertical pivot pin 68 mountable within a suitable apertured receiver 69 which may be in the form of a jack attached to the recording or reproducing apparatus or, alternatively, may be in the form of a suction cup attachment or the like which may be readily secured at any desired position near the take-up spool 12. Secured to the upper end of the pin 68 and held in position by retaining screw 68*a* is a substantially U-shaped bracket 70 having a lower base portion 70*a* and upwardly extending arms 70*b* and 70*c* each of which is provided with an elongated pin receiving slot 70*d* best shown in Fig. 5. The pin receiving slots 70*d* accommodate the horizontal pin 67 and cooperate with this pin to provide a means for extending the effective length of the arm member 51 between the axis of rotation of the take-up spool 12 and the axis of the fixedly positioned pivot pin 68. In order resiliently to support the arm member 51 and the counting and registering mechanism carried thereby at a suitable level when not in use, the pivot assembly 66 may include a resilient leaf spring 71 held on the upper end of the pin 68 by means of the retaining screw 68*a*. The leaf spring 71 is supported along an appreciable portion of its length by a rigid spring supporting finger 72 also attached to the upper end of the plug 68 and extending substantially in the same direction as the leaf spring 71. The leaf spring contacts the underside of the arm member 51 and limits its movement in a vertical plane.

In assembling the attachment 50 on the recording and reproducing apparatus with which it is to operate, the pin 68 is inserted within the receiver 69 thus rendering the arm 51 free to rotate in a horizontal plane about the vertical axis of the pin 68. The arm 51 may also be pivoted in a vertical plane as shown by the arrows 73 about the horizontal pin 67 seated in the slot 70*d*, this vertical movement being limited in the downward direction by the action of the leaf spring 71 and in the upward direction by contact between end portion 51*a* of the arm 51 and the edge of the receiver 69. It is apparent that the arm 51 may rotate in the vertical plane as indicated by the arrows 73 in Fig. 5 for a substantial distance, this vertical movement being considerably greater than the vertical movement permitted in the embodiment shown in Figs. 1 and 2. It is also apparent that the arm 51 may be moved linearly in a horizontal plane to extend the distance between the longitudinal axis of the pivot pin 68 and the axis of rotation of the take-up spool 12, the amount of this extension being limited by the length of the slot 70*d*.

From the foregoing explanation it will be apparent that after the pin 68 of the pivot assembly 66 has been placed within the receiver 69, the arm 51 is rotated in a horizontal plane, is adjusted in length, and is pivoted vertically about the pin 67 until the axis of the bushing 64 coincides with the axis of rotation of the take-up spool 12. When this position is reached, the driving assembly 60 is lowered so that the enlarged opening 65 in the bushing 64 telescopes over the drive shaft 12*c* and simultaneously therewith the connecting lug 62 registers with the slot 12*a* in the flange plate 12*b* of the take-up spool.

An alternative construction of the arm member and pivot mechanism is shown in Fig. 8 which differs from the arrangement shown in Fig. 4 principally by the use of a hinge link 77 which is adapted to move from the position represented by the solid lines to the position shown in dotted lines in order to extend the effective length of arm member 51' between a fixed remote point and the axis of rotation of the supply spool. The pivot assembly of Fig. 8 is similar to that shown in Fig. 4 in that it includes a vertical pivot pin 68' which is adapted to be inserted with a suitable receptacle not shown in the drawing but similar to the receiver 69 previously illustrated. The arm member 51' comprises an elongated flat section and an angularly extending portion 74 formed integral therewith, the upper end of the angular portion 74 being bent to encompass a small hinge pin 75. Also mounted on this hinge pin is the hinge link 77 the upper end of which is bent to encircle the pin 75 and the lower end of which is bent in similar fashion to encircle a lower hinge pin 78. The lower pin is secured to a horizontally disposed arm 79 which is fixedly attached to the pivot pin 68' by means of the screw 68a'. A leaf spring 71' is also retained on the upper end of the pivot pin 68' by means of the screw 68a', the spring 71' functioning to maintain arm 51' in a substantially horizontal position in order to limit the rotation of the arm member in a vertical plane when the attachment is not in use. The pivot assembly shown in Fig. 8 is disposed within a suitable housing 81 defined by a lower channel plate 80 attached to the pivot pin 68' and by a cover plate mounted on the channel for enclosing the movable elements of the pivot mechanism. The arm 51' and the resilient leaf 71' extend through an opening 81a formed in the housing for the purpose of allowing the insertion and withdrawal of a portion of the arm member 51' in order to adjust the arm length. As indicated above, adjustment of the distance between the vertical axis of the pin 68' and the axis of rotation of the take-up spool is facilitated by rotation of the hinge link 77 about the hinge pins 75 and 78 from the solid line position to that shown in dotted lines. The arm member 51' may be moved linearly in a horizontal direction toward or away from the pin 68' merely by moving the arm member into and out of the housing 81 in order to rotate the link 77 and to either add to or subtract from the length of the arm. The pivot mechanism shown in Fig. 8 permits rotation of the arm member 51' and the recording means attached thereto in a horizontal plane about the longitudinal axis of the pin 68' and permits somewhat limited movement of the arm 51' in a vertical plane. The downward vertical movement of the arm member 51' is limited by the resilient element 71' in contact with the underside of the arm 51' and the upward vertical movement is limited by the contact of the upper side of the arm 51' with the edge 82 forming the opening 81a in the housing 81. Aside from the slight difference in the operation of the pivot assembly, the indication attachment shown in Fig. 8 may be attached to the recording and reproducing apparatus in the same manner as described in conjunction with the embodiment shown in Figs. 4 and 5.

From the foregoing explanation it will be apparent that the present invention affords a satisfactory solution to the problem of indexing and identifying messages recorded on a long recording medium. It is also apparent that the mechanism described permits the assembly of the indicator on many types of recording and reproducing devices having various size take-up and supply spools and having different spacings between these spools. The indicator is constructed simply and inexpensively and may be employed by unskilled operators with little or no instruction.

While specific embodiments of the invention have been shown it will be understood, of course, that the invention is not limited thereto since many modifications may be made and it is, therefore, contemplated by the appended claims to cover any such modifications as fall within the true spirit of the invention.

What is claimed as new and desired to be secured by Letters Patent of the United States is:

1. The combination of a pair of spools rotatable about spaced axes in order to transfer a recording medium between the spools, a registering means including a register driving element adapted to be driven at a rate related to the rate of rotation of the first of said spools, spool supporting means for each of said spools, means for movably supporting said registering means in proximity to said first spool with the driving element operatively connected for rotation simultaneously with said first spool, said last named means including an arm having structure mounted thereon at a point remote from said registering means, and means for mounting said structure on the second of said spools to permit pivotal movement of the arm with respect to said structure about an axis remote from and parallel to the axis of rotation of said first spool.

2. The combination of claim 1 in which said arm includes a pair of movable members for adjusting the distance between the remote axis and the axis of rotation of said first spool.

3. The combination of first and second spools rotatable about spaced axes in order to transfer a record medium therebetween a registering means having a drive element, coupling means secured to said element and detachably engaged with said first spool for drivingly connecting said element and said first spool, a movable arm mounting said registering means and said coupling means, a member carried by said arm at a point remote from said registering means, and means mounted on said second spool cooperating with said member to support the arm for pivotal movement about a first axis in order to disengage said coupling means from the first spool and also to support said arm for pivotal movement about a second axis in order to move the registering means and the coupling means away from the first spool and permit removal of the first spool.

4. The combination of claim 3 wherein said arm includes a pair of relatively movable members for adjusting the distance between the supporting means and the registering means.

References Cited in the file of this patent

UNITED STATES PATENTS

| | | |
|---|---|---|
| 1,409,196 | Morfon | Mar. 14, 1922 |
| 1,528,315 | Barr et al. | Mar. 3, 1925 |
| 1,872,039 | James | Aug. 16, 1932 |

FOREIGN PATENTS

| | | |
|---|---|---|
| 366,998 | Germany | Jan. 20, 1923 |